United States Patent
Dixon et al.

(10) Patent No.: US 11,676,353 B2
(45) Date of Patent: *Jun. 13, 2023

(54) SYSTEMS AND METHODS CONFIGURED TO FACILITATE ANIMATION

(71) Applicant: Mindshow Inc., Los Angeles, CA (US)

(72) Inventors: Jeffrey Scott Dixon, Pasadena, CA (US); William Stuart Farquhar, Hollis, NH (US)

(73) Assignee: Mindshow Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/847,959

(22) Filed: Jun. 23, 2022

(65) Prior Publication Data

US 2022/0351471 A1    Nov. 3, 2022

Related U.S. Application Data

(63) Continuation of application No. 17/328,943, filed on May 24, 2021, now Pat. No. 11,380,076, which is a continuation of application No. 16/925,964, filed on Jul. 10, 2020, now Pat. No. 11,043,041.

(51) Int. Cl.
*G06T 19/00*    (2011.01)

(52) U.S. Cl.
CPC .................. *G06T 19/006* (2013.01)

(58) Field of Classification Search
None
See application file for complete search history.

(56) References Cited

U.S. PATENT DOCUMENTS

| 11,043,041 B1 | 6/2021 | Dixon |
| 2015/0084951 A1* | 3/2015 | Boivin ................. H04N 5/2621 345/419 |
| 2022/0012948 A1 | 1/2022 | Dixon |

OTHER PUBLICATIONS

Hu et al., "An Efficient Wireless Sensor Network for Real-Time Multiuser Motion Capture System" Dec. 2012, IEEE, 155-160, Year:2012, (6 pages).
PCT International Search Report and Written Opinion for PCT Application No. PCT/US2021/049737, dated Oct. 13, 2021 (6 pages).

* cited by examiner

*Primary Examiner* — Robert J Craddock
(74) *Attorney, Agent, or Firm* — Esplin & Associates, PC

(57) ABSTRACT

Systems and methods configured to facilitate animation are disclosed. Exemplary implementations may: obtain a first scene definition; receive second entity information; integrate the second entity information into the first scene definition such that a second scene definition is generated; for each of the entities of the entity information, execute a simulation of the virtual reality scene from the second scene definition for at least a portion of the scene duration; for each of the entities of the entity information, analyze the second scene definition for deviancy between the given entity and the second motion capture information; for each of the entities of the entity information, indicate, based on the analysis for deviancy, the given entity as deviant; and for each of the entities of the entity information, re-integrate the given entity into the second scene definition.

16 Claims, 5 Drawing Sheets

SYSTEMS AND METHODS CONFIGURED TO FACILITATE ANIMATION

FIELD OF THE DISCLOSURE

The present disclosure relates to systems and methods to facilitate animation.

BACKGROUND

Rendering a virtual reality scene that includes multiple entities may require combining performances of the entities that were performed at different times. However, subsequent character performances to a first entity performance may contradict the first entity performance as well as other entities in the virtual reality scene.

SUMMARY

One aspect of the present disclosure relates to facilitating building a virtual reality scene by layering performances. A first performance by a first entity may be integrated into the virtual reality scene. Based on the first performance, a second performance by a second entity may be integrated into the scene. The first performance (and any other prior entity performances of the scene) may be analyzed to determine if the second performance affects any of the previously integrated performances. If affected, the first performance may be appropriately re-integrated into the virtual reality scene.

One aspect of the present disclosure relates to a system configured to facilitate animation. The system may include one or more hardware processors configured by machine-readable instructions. Machine-readable instructions may include one or more instruction components. The instruction components may include computer program components. The instruction components may include one or more of scene definition obtaining component, entity component, integration component, simulation execution component, scene analysis component, and/or other instruction components.

The scene definition obtaining component may be configured to obtain a first scene definition. The first scene definition may include scene information. The scene information may define a virtual reality scene. The virtual reality scene may include integrated motion capture information of entities within a virtual reality setting over a scene duration from a scene beginning to a scene end. The scene information may include setting information, entity information, and/or other information. The setting information may define the setting. The entity information may define the entities and the motion capture information of the entities. By way of non-limiting example, the scene information may include first entity information and/or other information. The first entity information may define a first entity and first motion capture information for the first entity. The first motion capture information may characterize motion and/or sound made by a first user per frame during a first portion of the scene duration. As such, the first user virtually may embody the first entity. The frames may be in sequential order.

The entity component may be configured to receive second entity information. The second entity information may define a second entity and second motion capture information. The second motion capture information may characterize motion and/or sound made by a second user per frame during a second portion of the scene duration. As such, the second user virtually embodies the second entity. The first portion and the second portion of the scene duration may have at least some overlap.

The integration component may be configured to integrate the second entity information into the first scene definition. As such, a second scene definition is generated. The second scene definition may include the first scene definition and the second entity information. The integrated second motion capture information may affect the motion capture information of the entities.

The simulation execution component may be configured to execute a simulation of the virtual reality scene from the second scene definition for at least a portion of the scene duration. Executing the simulation may be for each of the entities of the entity information.

The scene analysis component may be configured to analyze the second scene definition for deviancy between the given entity and the second motion capture information. Analyzing the second scene definition for deviancy may be for each of the entities of the entity information. The deviancy may characterize the motion capture information of the given entity as incompliant with the second motion capture information based on the integration of the second motion capture information. The scene analysis component may be configured to indicate the given entity as deviant. Indicating the given entity as deviant may be performed for each of the entities of the entity information. Indicating the given entity as deviant may be based on the analysis for deviancy.

The integration component may be configured to re-integrate the given entity into the second scene definition. Re-integrating the given entity may be performed for each of the entities of the entity information.

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
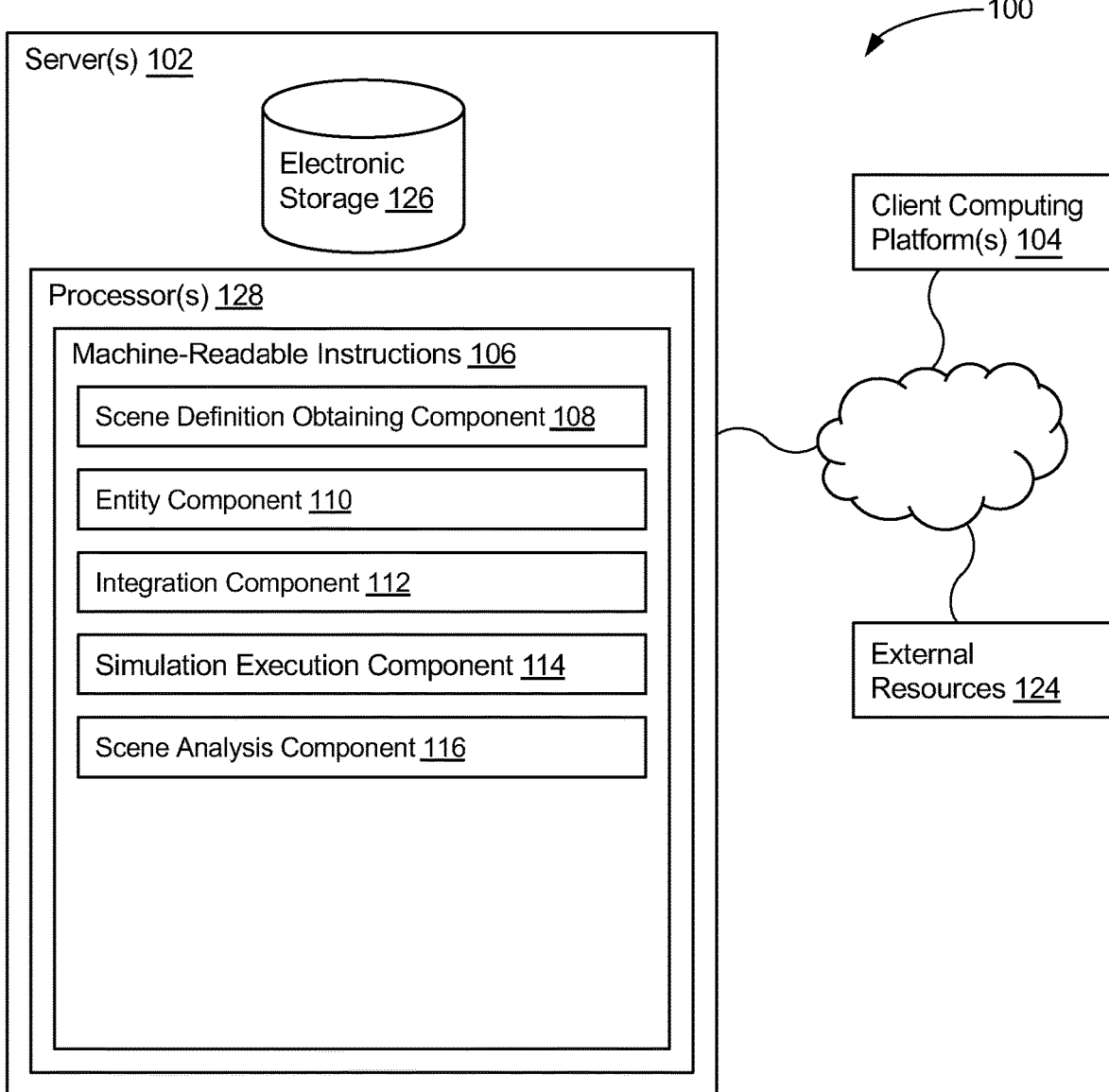
FIG. 1 illustrates a system configured to facilitate animation, in accordance with one or more implementations.

FIG. 1 illustrates a system 100 configured to facilitate animation, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction components. The instruction components may include computer program components. The instruction components may include one or more of scene definition obtaining component 108, entity component 110, integration component 112, simulation execution component 114, scene analysis component 116, and/or other instruction components.

Scene definition obtaining component 108 may be configured to obtain scene definitions. A scene definition may include scene information that defines a virtual reality scene. The virtual reality scene may include integrated motion capture information of entities within a virtual reality setting over a scene duration from a scene beginning to a scene end. The integrated motion capture information may characterize motion and/or sound made by one or more users per frame during one or more portions of the scene duration. The scene duration may span from a scene beginning to a scene end. The scene beginning may be the start of the virtual reality scene. The scene end may be the termination of the virtual reality scene.

The scene information may include setting information, entity information, and/or other information. The setting information may define the setting of the virtual reality scene. The setting may comprise a virtual environment that surrounds one or more of the entities within the virtual reality scene. The setting information may include setting values that define setting parameters including one or more of a visual appearance, ambient audio, lighting, and/or other setting parameters. The visual appearance may include one or more of a color, shading, a pattern, a texture, an animation, and/or other visual appearances. Ambient audio may include one or more background noises such as car traffic, animal noises (e.g., dog barking, birds chirping), talking, and/or other ambient audio. Lighting may include ambient lighting, spot lighting, accent lighting, and/or other lighting.

The entity information may define the one or more entities of the virtual reality scene, the motion capture information of the one or more entities, and/or other information related to the one or more entities. The entity information may include entity values that define entity parameters including one or more of a visual appearance, an audio, a location, a pose of the entity, and/or entity parameters. The visual appearance of the individual entities may include one or more of clothing, height, width, hairstyle, accessories, skin color, headwear, and/or other visual appearances. The audio of the individual entities may include entity voices, entity-initiated noises (e.g., stomp, clap, etc.) and/or other audio related to the individual entities. Individual locations of the individual entities may change throughout the scene duration. For example, the entities may walk, run, dance, fight, and/or other actions of which change the location of the individual entities. The individual locations of the individual entities may define virtual coordinates within the setting that adjust with movement of the entities. Pose of the individual entities may define the posture, attitude (i.e., values for a yaw angle, a pitch angle, roll angle) of the entity's body, attitude of the entity's head, and/or other poses of the individual entities. The attitude may include values for a yaw angle, a pitch angle, and a roll angle. The motion capture information of the entities may include a change in one or more of the attitudes, the pose, the location, the audio, and/or other entity values so that the motion and/or the sound of the entity is depicted. In some implementations, entity information may be obtained from a library (e.g., electronic storage 126) that may include pre-built entity animations. Meaning, a pre-built entity animation may include pre-defined values for the entity information of an entity.

By way of non-limiting illustration, the scene definitions may include a first scene definition. The first scene definition may include scene information that defines the virtual reality scene. The scene information may include first entity information. The first entity information may define a first entity, first motion capture information for the first entity, and/or other information related to the first entity. The first motion capture information may characterize motion and/or sound made by a first user per frame during a first portion of the scene duration. As such, the first user may virtually embody the first entity. The frames of the first portion may be in sequential order. Meaning, as the frames of the first portion progress from the scene beginning to the scene end, the first user may be depicted as virtually embodying the first entity.

Entity component 110 may be configured to receive one or more of the entity information for the individual entities. The one or more of the entity information may include second entity information such that the second entity information is received. The second entity information may define a second entity, second motion capture information, and/or other information related to the second entity. The second motion capture information may characterize motion and/or sound made by a second user per frame during a second portion of the scene duration. As such, the second user may virtually embody the second entity. The first portion and the second portion of the scene duration may have at least some overlap. That is, before the first portion of the scene duration ends, the second portions of the scene duration may begin.

In some implementations, entity component 110 may be configured to record motion capture information for one or more of the entities. Recording the motion capture information may save the motion and/or sound of a given entity to electronic storage 126. The motion capture information may be recorded by a different user than ones that embody other entities or may be the same user as the ones that embody the other entities. Entity information received and/or recorded via entity component 110 may be integrated with or otherwise inserted into a particular scene definition that defines a virtual reality scene. In some implementations, the integration may include physics simulation.

By way of non-limiting example, third motion capture information for a third entity may be recorded. The third entity may be defined by third entity information. The recorded third motion capture information may characterize the motion and/or sound made by the first user per frame during a third portion of the scene duration. In some implementations, the third motion capture information may characterize the motion and/or sound may by a different user (e.g., a third user). As such, the first user (or the third user, in some implementations) may virtually embody the third entity.

In some implementations, the scene information may include fourth entity information defining an inanimate object. The fourth entity information may include fourth motion capture information for the inanimate object. Inanimate objects may include one or more of a furniture, a rock, a vehicle, a weapon, a ball, among others. The inanimate objects may be defined by entity values that define the one or more entity parameters. Visual appearance of the inanimate objects may include one or more of a color, a text, a text font, a text size, a pattern, a shading, a texture, a size, a size relative to the setting, and/or other visual appearances. The attitude may include values for a yaw angle, a pitch angle, and a roll angle. Adjustment of the attitude of the inanimate objects may rotate the inanimate objects, for example. The audio of the inanimate objects may include for example, creak audio for furniture, engine audio for a vehicle, burst audio for a weapon, bounce audio for a ball, among others. The inanimate objects may be placed in a particular location of the setting. The location may define virtual coordinates within the setting. For example, the fourth motion capture information may characterize the motion and/or sound of the inanimate object such that the inanimate object is stationary. The inanimate object may be stationary in one or more of the portions of the scene durations. For example, the inanimate object may be stationary during the first portion of the scene duration.

Integration component 112 may be configured to integrate the one or more of the entity information into the scene definition. Integrating the one or more of the entity information into the scene definition may be incorporating, finalizing, or otherwise combining, entity information received with previously integrated motion capture information within the virtual reality scene (defined by the scene definition). For example, the second entity information may be integrated into the first scene definition (i.e., with the first motion capture information). As a result, a second scene definition may be generated. Therefore, the second scene definition may include the first scene definition and the second entity information. As such, the integration of the second entity information into the first scene definition may include combining the second motion capture information with the first motion capture information as though initially performed contemporaneously. The second scene definition may be deterministic, meaning the second scene definition is determined based on the integration of the one or more entity information. The second motion capture information integrated into the first scene definition may affect the motion capture information of the entities such as the first motion capture information of the first entity. In some implementations, the third entity information may be integrated into the second scene definition. Integration of the third entity information may generate a third scene definition or modify the second scene definition.

Simulation execution component 114 may be configured to execute a simulation of the virtual reality scene from a particular scene definition for at least a portion of the scene duration. Executing the simulation may be performed for each of the entities of the entity information. Executing the simulation may be performed upon each integration of entity information. The simulation may be an initial generation and/or presentation of the virtual reality scene (i.e., the setting and the individual entity information) of which a user or scene analysis component 116 may analyze so that the virtual reality scene is coherent from the scene beginning to the scene end. The motion capture information may be coherent with (most recently) integrated motion capture information when both of the motion capture information are logically ordered within the scene duration, are aesthetically ordered within the scene duration, logically progress within the scene duration, and/or aesthetically progress within the scene duration. Therefore, the individual entities and the motion capture information of the individual entities may be simulated so that the motion and/or sound of the individual entities may be previewed in different combinations. The combinations may include simulations of the motion capture information individually or a simulation of multiple of the motion capture information together.

By way of non-limiting example, a simulation of the second scene definition for at least a portion of the scene duration may be executed. As a result, the simulation of the virtual reality scene from the second scene definition for at least the portion of the scene duration includes contemporaneous presentation of the first portion of the scene duration and the second portion of the scene duration. Because the first portion and the second portion have at least some overlap, the motion capture information within the overlap may be presented.

In some implementations, upon the integration of entity information with the particular scene definition, the virtual reality scene that is defined by the setting information and the one or more entity information may not require a simulation as the virtual reality scene is based on the one or more entity information being in accordance with the setting information.

Scene analysis component 116 may be configured to analyze a particular scene definition for deviancy between a given entity and the most recently integrated motion capture information. The deviancy may characterize the motion capture information of the given entity as incompliant with the most recently integrated motion capture information due to the integration of the most recently integrated motion capture information. Incompliancy of the motion capture information of the given entity may be that the motion capture information of the given entity does not complement or is illogical with the most recently integrated motion capture information. Analyzing the scene definition for deviancy between the given entity and the most recently integrated motion capture information may include determining whether the motion capture information of the given entity is coherent with the most recently integrated motion capture information. Analyzing the particular scene definition for deviancy may be performed for each of the entities of the entity information. Analyzing the particular scene definition for deviancy may be performed upon each integration of entity information. In some implementations, analyzing the scene definition may occur upon integration of entity information with the particular scene definition.

By way of non-limiting example, the second scene definition may be analyzed for deviancy between the first motion capture information of the first entity and the second motion capture information. Deviancy of the first motion capture information characterizes that the first motion capture information may be incompliant with the second motion capture information because of the integration of the second motion capture information. Analyzing the second scene definition for deviancy between (the first motion capture information of) the first entity and the second motion capture information may include determining whether the first motion capture information is coherent or not with the second motion capture information. In some implementations, analyzing the second scene definition for deviancy may include analyzing the overlap (i.e., where the first portion and the second portion of the scene duration overlap) of the first motion capture information and the second motion capture information for coherency or lack thereof.

In some implementations, analyzing the particular scene definition for deviancy includes analyzing the particular scene definition for deviancy between one or more inanimate objects and previous integrated motion capture information. By way of non-limiting example, the second scene definition may be analyzed for deviancy between the inanimate object and the second motion capture information. As such, the second scene definition may be analyzed for deviancy between the fourth motion capture information and the second motion capture information. That is, it may be determined whether the second motion capture information affects the fourth motion capture information. In other words, for example, a scene definition may include a first worker picking up a hammer at time 10 along the scene duration (i.e., primary motion capture information) and a second worker picking up the same hammer at time 5 along the scene duration (i.e., secondary motion capture information). Analysis of such scene definition may indicate deviancy because the hammer will not be present for the first worker at time 10.

Scene analysis component 116 may be configured to indicate the given entity as deviant. Indicating the given entity as deviant may be based on the analysis for deviancy. Indicating the given entity as deviant may be performed for each of the entities of the entity information upon determining the given entity is deviancy via the analysis. Indicating the given entity as deviant may be performed upon each integration of entity information. Indicating, based on the analysis for deviancy, the given entity as deviant may characterize determining that the motion capture information of the given entity is incoherent with the most recently integrated motion capture information. Therefore, contemporaneous presentation of one or more portions of the scene duration may not be logically nor aesthetically ordered.

By way of non-limiting example, indicating, based on the analysis for deviancy, the first entity as deviant may characterize determining that the first motion capture information of the first entity is incoherent with the second motion capture information. Thus, contemporaneous presentation of the first portion of the scene duration and the second portion of the scene duration may not be logically nor aesthetically ordered (e.g., at the overlap).

In some implementations, scene analysis component 116 may indicate, based on the analysis for deviancy, the inanimate object as deviant. The inanimate object may be indicated as deviant as a result of the integration of the second motion capture information. Meaning, upon the integration of the second motion capture information, the fourth motion capture information (i.e., the stationary inanimate object during the first portion of the scene duration) is incoherent within the virtual reality scene. Therefore, upon execution of the simulation of the virtual reality scene, the fourth motion capture information and the second motion capture information presented contemporaneously may not be logically nor aesthetically ordered.

Integration component 112 may be configured to re-integrate the given entity into a particular scene definition. Re-integrating may be responsive to the indication that the given entity is deviant. Re-integrating may be performed for each of the entities of the entity information of which were indicated as deviant. The re-integration of the given entity into the particular scene definition may include combining the motion capture information of the given entity with the most recently integrated motion capture information as though the entity information (i.e., the most recently integrated motion capture information) were integrated into the particular scene definition prior to or contemporaneous with the given entity. Re-integrating the given entity may include updating, adjusting, or otherwise modifying one or more of the entity values that define one or more of the entities and/or the inanimate objects. In some implementations, the given entity may be re-integrated into the particular scene definition for only a portion of the scene duration of the virtual reality scene.

By way of non-limiting example, the re-integration of the first entity into the second scene definition may include combining the first motion capture information of the first entity with the second motion capture information as though the second entity information were integrated into the second scene definition prior to or contemporaneous with the first entity information the first entity. Such re-integration may include modifying the entity values of the first entity so that the location, the pose, and the audio of the first entity are modified to be in accordance with the second motion capture information.

In some implementations, re-integrating the given entity into the second scene definition may include re-integrating the inanimate object into the second scene definition. Thus, the first entity, the second entity, the third entity, and/or the inanimate object may be re-integrated upon integration into the first scene definition and/or the second scene definition, executing the simulation of the virtual reality scene, analyzing for deviancy, and indicating deviancy.

Figure 3A:
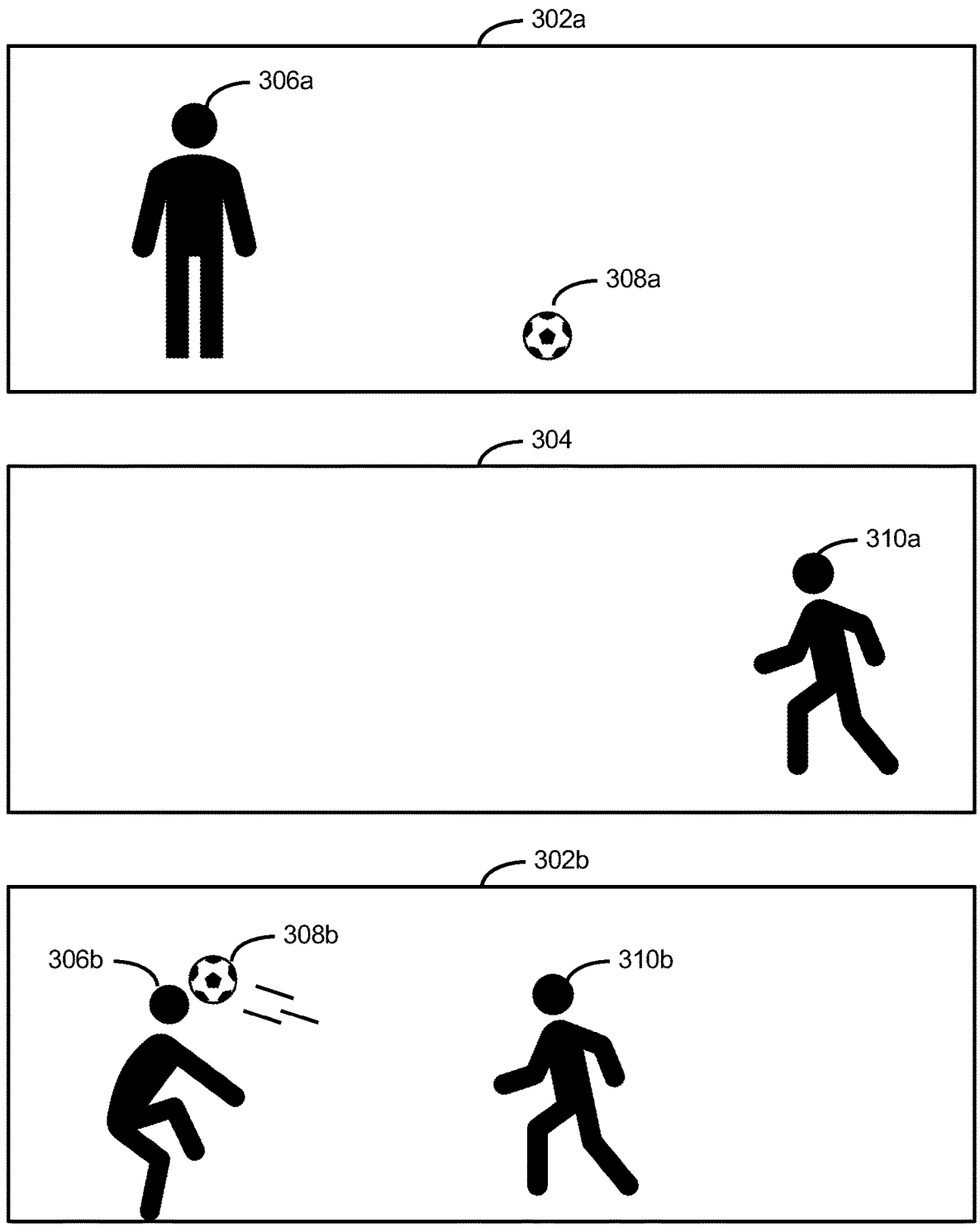
FIG. 3A illustrates an example implementation for a system configured to facilitate animation, in accordance with one or more implementations.

FIG. 3A illustrates an example implementation for a system configured to facilitate animation, in accordance with one or more implementations. FIG. 3A may include scene definition 302a, entity information 304, and scene definition 302b of a virtual reality scene. Scene definition 302a may include individual motion capture information of entity 306a and ball 308a (i.e., inanimate object). Entity 306a may be motionless and ball 308a may be motionless (i.e., the respective motion capture information). Entity information 304 may include an entity 310a running and kicking. Integration of entity information 304 with scene definition 302a may generate a secondary scene definition of which causes an indication of deviancy for entity 306a because motion of entity 310a's run and kick may cause ball 308a to move towards entity 306a. Ball 308a moving towards entity 306a may warrant a reaction motion and/or sound from entity 306a. Therefore, the integration of entity information 304 with scene definition 302a may be incoherent. Upon re-integration of entity 306a with entity information 304, the secondary scene definition, or scene definition 302b, may include re-integrated entity 306b (the same as entity 306a) and ball 308b (the same as ball 308a) so that the motion and/or sound of each of entity 310b (the same as entity 310a), ball 308b, entity 306b occur as though initially performed contemporaneously from scene beginning to scene end.

Figure 3B:
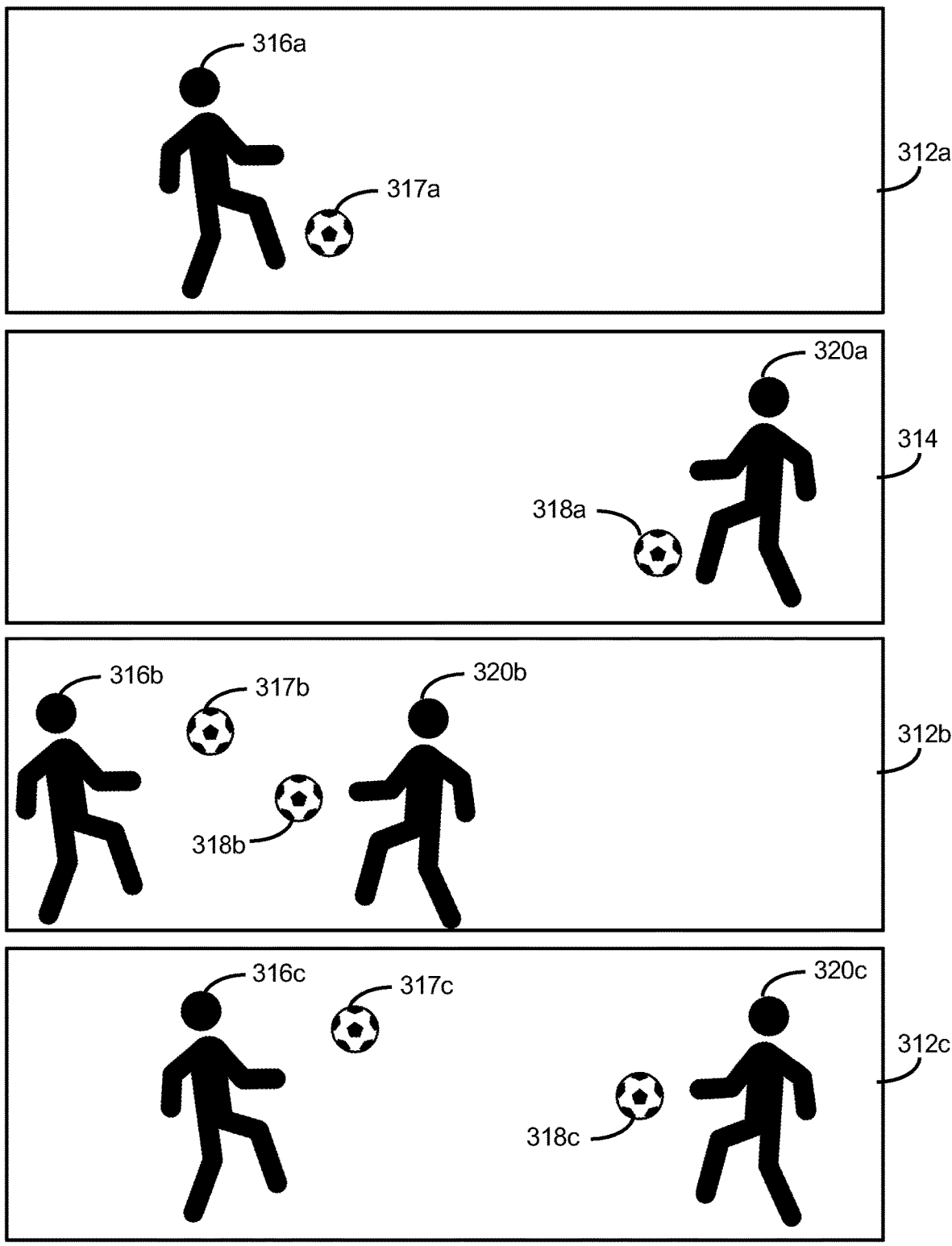
FIG. 3B illustrates an example implementation for a system configured to facilitate animation, in accordance with one or more implementations.

FIG. 3B illustrates an example implementation for a system configured to facilitate animation, in accordance with one or more implementations. FIG. 3B may include a primary scene definition 312a, entity information 314, a scene portion 312b of a secondary scene definition, and a scene portion 312c of the secondary scene definition. Primary scene definition 312a may include primary motion capture information characterizing entity 316a juggling ball 317a (i.e., inanimate object). Entity information 314 may include secondary motion capture information characterizing an entity 320a juggling a ball 318a while moving forward and then moving backward, relative to entity 320a. Integration of entity information 314 with scene definition 312a may generate the secondary scene definition. Such integration may cause an indication of deviancy within the secondary scene definition for entity 316a and ball 317a because the forward motion juggling of entity 320a may interfere with the juggling of entity 316a where entity 316a may have to move backwards. Thus, only a portion, scene portion 312b, of the secondary scene definition may require re-integration. As such, upon the re-integration, scene portion 312b may include motion capture information so that entity 316b (the same as 316a) and ball 317b (the same as 317a) move backward as entity 320b (the same entity 320a) ball 318b (the same as 318a) move forward. The remainder of the secondary scene definition, including scene portion 312c, may not require re-integration as entity 316c (the same as entity 316b) and ball 317c (the same as ball 317b) may remain in the same location as did in primary scene definition 312a while entity 320c (the same as 320b) and ball 318c (the same as ball 318b) move backward. As a result, the secondary scene definition may include re-integrated scene portion 312b and not scene portion 312c so that the motion and/or sound of each entity 316c, ball 317c, entity 320c, and ball 318c occur as though initially performed contemporaneously from scene beginning to scene end.

Figure 4:
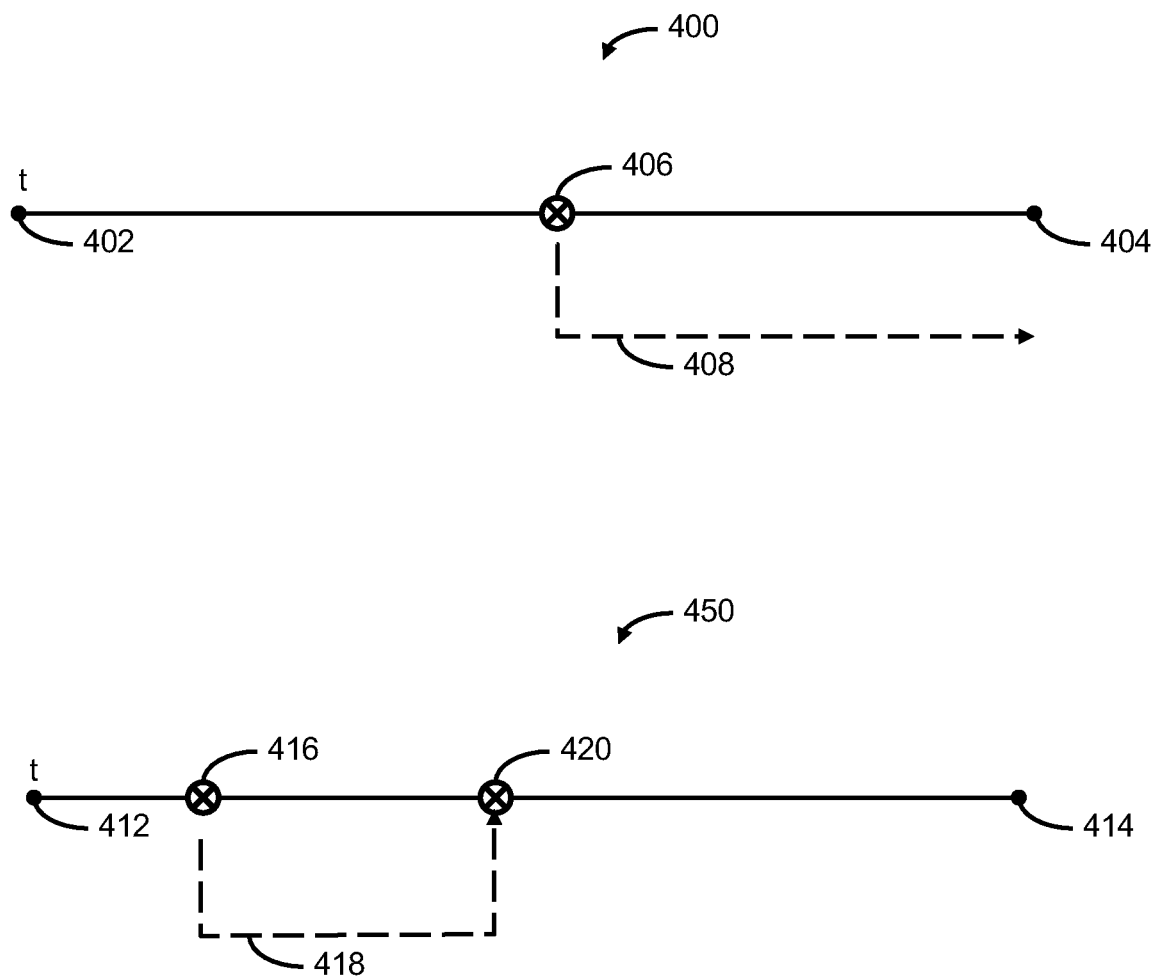
FIG. 4 illustrates an example scene duration, in accordance with one or more implementations.

FIG. 4 illustrates an example scene duration, in accordance with one or more implementations. FIG. 4 may include scene duration 400 for the virtual reality scene of FIG. 3A. Scene duration 400 may span from a scene beginning 402 to a scene end 404. Contemporaneously referencing FIG. 3A, at time 406 may be when received entity information (e.g., entity information 304) is integrated into a scene definition (e.g., scene definition 302a). A portion 408 may depict the portion of the scene duration that may require re-integration of the scene definition. For example, entity 306b required re-integration for the remainder of the scene duration of the virtual reality scene of FIG. 3A.

Scene duration 450 may span from a scene beginning 412 to a scene end 414. Contemporaneously referencing FIG. 3B, at time 416 may be when received entity information (e.g., entity information 314) is integrated into a scene definition (e.g., primary scene definition 312a). A portion 418 may depict the portion of the scene duration that may require re-integration of the primary scene definition 312a. For example, entity 316b required re-integration for only scene portion 312b of the scene duration for the virtual reality scene of FIG. 3B. At time 420 may be when the scene definition did not require re-integration (e.g., entity 316c) until scene end 414.

Referring back to FIG. 1, in some implementations, server(s) 102, client computing platform(s) 104, and/or external resources 124 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 124 may be operatively linked via some other communication media.

A given client computing platform 104 may include one or more processors configured to execute computer program components. The computer program components may be configured to enable an expert or user associated with the given client computing platform 104 to interface with system 100 and/or external resources 124, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 124 may include sources of information outside of system 100, external entities participating with system 100, and/or other resources. In some implementations, some or all of the functionality attributed herein to external resources 124 may be provided by resources included in system 100.

Server(s) 102 may include electronic storage 126, one or more processors 128, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 126 may comprise non-transitory storage media that electronically stores information. The electronic storage media of electronic storage 126 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 126 may include one or more virtual storage resources (e.g., cloud storage, a virtual private network, and/or other virtual storage resources). Electronic storage 126 may store software algorithms, information determined by processor(s) 128, information received from server(s) 102, information received from client computing platform(s) 104, and/or other information that enables server(s) 102 to function as described herein.

Processor(s) 128 may be configured to provide information processing capabilities in server(s) 102. As such, processor(s) 128 may include one or more of a digital processor, an analog processor, a digital circuit designed to process information, an analog circuit designed to process information, a state machine, and/or other mechanisms for electronically processing information. Although processor(s) 128 is shown in FIG. 1 as a single entity, this is for illustrative purposes only. In some implementations, processor(s) 128 may include a plurality of processing units. These processing units may be physically located within the same device, or processor(s) 128 may represent processing functionality of a plurality of devices operating in coordination. Processor(s) 128 may be configured to execute components 108, 110, 112, 114, and/or 116, and/or other components. Processor(s) 128 may be configured to execute components 108, 110, 112, 114, and/or 116, and/or other components by software; hardware; firmware; some combination of software, hardware, and/or firmware; and/or other mechanisms for configuring processing capabilities on processor(s) 128. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, and/or 116 are illustrated in FIG. 1 as being implemented within a single processing unit, in implementations in which processor(s) 128 includes multiple processing units, one or more of components 108, 110, 112, 114, and/or 116 may be implemented remotely from the other components. The description of the functionality provided by the different components 108, 110, 112, 114, and/or 116 described below is for illustrative purposes, and is not intended to be limiting, as any of components 108, 110, 112, 114, and/or 116 may provide more or less functionality than is described. For example, one or more of components 108, 110, 112, 114, and/or 116 may be eliminated, and some or all of its functionality may be provided by other ones of components 108, 110, 112, 114, and/or 116. As another example, processor(s) 128 may be configured to execute one or more additional components that may perform some or all of the functionality attributed below to one of components 108, 110, 112, 114, and/or 116.

Figure 2:
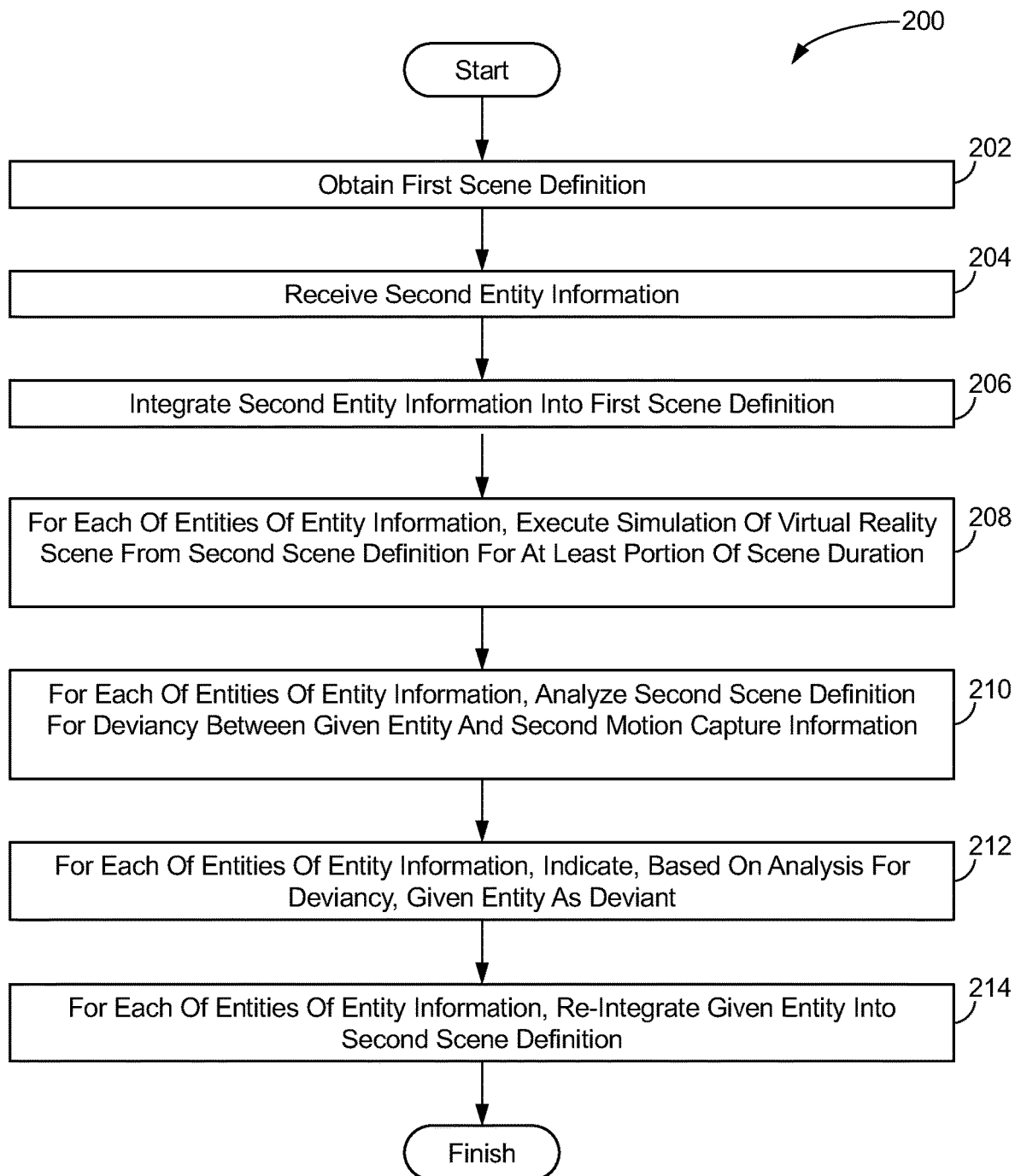
FIG. 2 illustrates a method to facilitate animation, in accordance with one or more implementations.

FIG. 2 illustrates a method 200 configured to facilitate animation, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include obtaining the first scene definition. The first scene definition may include scene information that defines a virtual reality scene. Operation 202 may be performed by one or more hardware processors configured by machine-readable instructions including a component that is the same as or similar to scene definition obtaining component 108, in accordance with one or more implementations.

An operation 204 may include receiving second entity information. The second entity information may define a second entity and second motion capture information characterizing motion and/or sound made by a second user per frame during a second portion of the scene duration such that the second user virtually embodies the second entity. Operation 204 may be performed by one or more hardware processors configured by machine-readable instructions including a component that is the same as or similar to entity component 110, in accordance with one or more implementations.

An operation 206 may include integrating the second entity information into the first scene definition. As such, a second scene definition is generated. The second scene definition may include the first scene definition and the second entity information. Operation 206 may be performed by one or more hardware processors configured by machine-readable instructions including a component that is the same as or similar to integration component 112, in accordance with one or more implementations.

An operation 208 may include for each of the entities of the entity information, executing a simulation of the virtual reality scene from the second scene definition for at least a portion of the scene duration. Operation 208 may be performed by one or more hardware processors configured by machine-readable instructions including a component that is the same as or similar to simulation execution component 114, in accordance with one or more implementations.

An operation 210 may include for each of the entities of the entity information, analyzing the second scene definition for deviancy between the given entity and the second motion capture information. The deviancy may characterize the motion capture information of the given entity as incompliant with the second motion capture information based on the integration of the second motion capture information. Operation 210 may be performed by one or more hardware processors configured by machine-readable instructions including a component that is the same as or similar to scene analysis component 116, in accordance with one or more implementations.

An operation 212 may include for each of the entities of the entity information, indicating, based on the analysis for deviancy, the given entity as deviant. Operation 212 may be performed by one or more hardware processors configured by machine-readable instructions including a component that is the same as or similar to scene analysis component 116, in accordance with one or more implementations.

An operation 214 may include for each of the entities of the entity information, re-integrating the given entity into the second scene definition. Operation 214 may be performed by one or more hardware processors configured by machine-readable instructions including a component that is the same as or similar to integration component 112, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to facilitate animation, the system comprising:
   one or more physical processors configured by machine-readable instructions to:
      obtain a first scene definition, the first scene definition including scene information that defines a virtual scene, the virtual scene including integrated motion capture information of entities within a virtual setting over a scene duration from a scene beginning to a scene end, the scene information including entity information, the entity information defining individual ones of the entities and the motion capture information of the entities, wherein the scene information includes first entity information, the first entity information defining a first entity and first motion capture information for the first entity, the first motion capture information characterizing motion and/or sound made by a first user during a first portion of the scene duration such that the first user virtually embodies the first entity;

receive second entity information, the second entity information defining a second entity and second motion capture information characterizing motion and/or sound made by a second user during a second portion of the scene duration such that the second user virtually embodies the second entity, wherein the first portion and the second portion of the scene duration have at least some overlap;

integrate the second entity information into the first scene definition such that a second scene definition is generated, the second scene definition including the first scene definition and the second entity information, wherein the integrated second motion capture information affects the motion capture information of the entities;

for each of the entities of the entity information:
execute a simulation of the virtual scene from the second scene definition for at least a portion of the scene duration; analyze the second scene definition for deviancy between a given entity and the second motion capture information, wherein the deviancy characterizes the motion capture information of the given entity as incompliant with the second motion capture information based on the integration of the second motion capture information;
indicate, based on the analysis for deviancy, the given entity as deviant; and
re-integrate the given entity into the second scene definition.

2. The system of claim 1, wherein the integration of the second entity information into the first scene definition includes combining the second motion capture information with the first motion capture information as though initially performed contemporaneously such that the simulation of the virtual scene from the second scene definition for at least the portion of the scene duration includes contemporaneous presentation of the first portion of the scene duration and the second portion of the scene duration.

3. The system of claim 1, wherein analyzing the second scene definition for deviancy between the given entity and the second motion capture information includes determining whether the motion capture information of the given entity is coherent with the second motion capture information.

4. The system of claim 3, wherein indicating, based on the analysis for deviancy, the given entity as deviant characterizes determining that the motion capture information of the given entity is incoherent with the second motion capture information such that contemporaneous presentation of the first portion of the scene duration and the second portion of the scene duration is not logically nor aesthetically ordered.

5. The system of claim 1, wherein the re-integration of the given entity into the second scene definition includes combining the motion capture information of the given entity with the second motion capture information as though the second entity information were integrated into the second scene definition prior to the given entity.

6. The system of claim 1, wherein the one or more processors are further configured by machine-readable instructions to:
record third motion capture information for a third entity, the third entity defined by third entity information, the recorded third motion capture information characterizing the motion and/or sound made by the first user or a different user per frame during a third portion of the scene duration such that the first user or the different user virtually embodies the third entity; and
integrate the third entity information into the second scene definition.

7. The system of claim 1, wherein the scene information includes fourth entity information defining an inanimate object and including fourth motion capture information for the inanimate object, the fourth motion capture information characterizing the motion and/or sound of the inanimate object such that the inanimate object is stationary,
wherein analyzing the second scene definition for deviancy between the inanimate object and the second motion capture information includes analyzing the second scene definition for deviancy between the fourth motion capture information and the second motion capture information,
wherein indicating, based on the analysis for deviancy, the given entity as deviant includes indicating, based on the analysis for deviancy, the inanimate object as deviant, and
wherein re-integrating the given entity into the second scene definition includes re-integrating the inanimate object into the second scene definition.

8. The system of claim 1, wherein the motion capture information of the entities includes attitude, pose, and/or location, the attitude including a yaw angle, a pitch angle, and a roll angle.

9. A method to facilitate animation, the method comprising:
obtaining a first scene definition, the first scene definition including scene information that defines a virtual scene, the virtual scene including integrated motion capture information of entities within a virtual setting over a scene duration from a scene beginning to a scene end, the scene information including entity information, the entity information defining individual ones of the entities and the motion capture information of the entities, wherein the scene information includes first entity information, the first entity information defining a first entity and first motion capture information for the first entity, the first motion capture information characterizing motion and/or sound made by a first user during a first portion of the scene duration such that the first user virtually embodies the first entity
receiving second entity information, the second entity information defining a second entity and second motion capture information characterizing motion and/or sound made by a second user during a second portion of the scene duration such that the second user virtually embodies the second entity, wherein the first portion and the second portion of the scene duration have at least some overlap;
integrate the second entity information into the first scene definition such that a second scene definition is generated, the second scene definition including the first scene definition and the second entity information, wherein the integrated second motion capture information affects the motion capture information of the entities; for each of the entities of the entity information:
   executing a simulation of the virtual scene from the second scene definition for at least a portion of the scene duration;
   analyzing the second scene definition for deviancy between a given entity and the second motion capture information, wherein the deviancy characterizes the motion capture information of the given entity as incompliant with the second motion capture information based on the integration of the second motion capture information;
indicating, based on the analysis for deviancy, the given entity as deviant; and
re-integrating the given entity into the second scene definition.

10. The method of claim 9, wherein the integration of the second entity information into the first scene definition includes combining the second motion capture information with the first motion capture information as though initially performed contemporaneously such that the simulation of the virtual scene from the second scene definition for at least the portion of the scene duration includes contemporaneous presentation of the first portion of the scene duration and the second portion of the scene duration.

11. The method of claim 9, wherein analyzing the second scene definition for deviancy between the given entity and the second motion capture information includes determining whether the motion capture information of the given entity is coherent with the second motion capture information.

12. The method of claim 11, wherein indicating, based on the analysis for deviancy, the given entity as deviant characterizes determining that the motion capture information of the given entity is incoherent with the second motion capture information such that contemporaneous presentation of the first portion of the scene duration and the second portion of the scene duration is not logically nor aesthetically ordered.

13. The method of claim 9, wherein the re-integration of the given entity into the second scene definition includes combining the motion capture information of the given entity with the second motion capture information as though the second entity information were integrated into the second scene definition prior to the given entity.

14. The method of claim 9, further comprising:
   recording third motion capture information for a third entity, the third entity defined by third entity information, the recorded third motion capture information characterizing the motion and/or sound made by the first user or a different user per frame during a third portion of the scene duration such that the first user or the different user virtually embodies the third entity; and
integrating the third entity information into the second scene definition.

15. The method of claim 9, wherein the scene information includes fourth entity information defining an inanimate object and including fourth motion capture information for the inanimate object, the fourth motion capture information characterizing the motion and/or sound of the inanimate object such that the inanimate object is stationary,
   wherein analyzing the second scene definition for deviancy between the inanimate object and the second motion capture information includes analyzing the second scene definition for deviancy between the fourth motion capture information and the second motion capture information,
   wherein indicating, based on the analysis for deviancy, the given entity as deviant includes indicating, based on the analysis for deviancy, the inanimate object as deviant, and
   wherein re-integrating the given entity into the second scene definition includes re-integrating the inanimate object into the second scene definition.

16. The method of claim 9, wherein the motion capture information of the entities includes attitude, pose, and/or location, the attitude including a yaw angle, a pitch angle, and a roll angle.

* * * * *